UNITED STATES PATENT OFFICE.

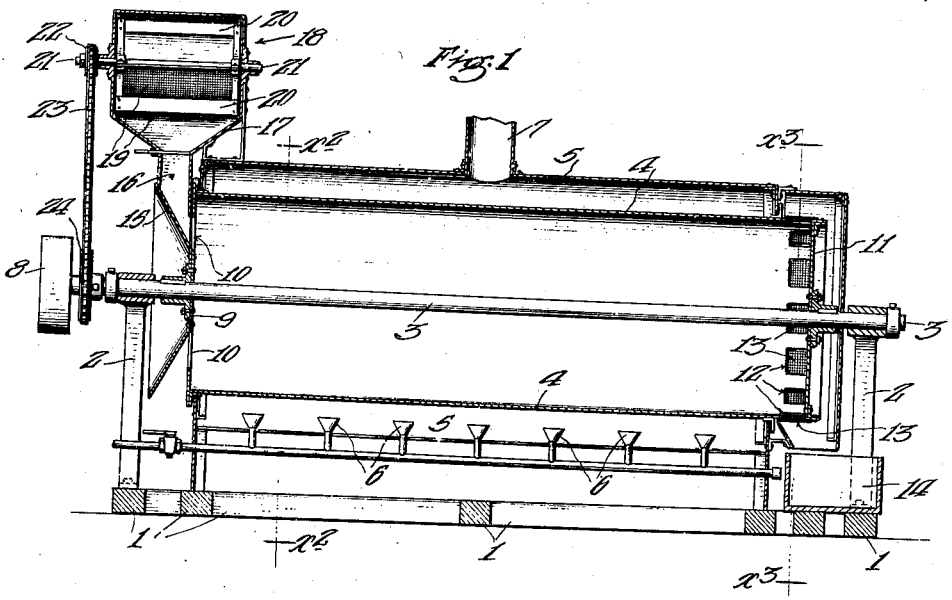

JOSEPH WALLOS, OF LOS ANGELES, CALIFORNIA.

PROCESS OF BROWNING FLOUR.

1,079,676.  Specification of Letters Patent.  Patented Nov. 25, 1913.

Application filed May 19, 1913. Serial No. 768,689.

*To all whom it may concern:*

Be it known that I, JOSEPH WALLOS, a citizen of the United States, residing at Los Angeles, in the county of Los Angeles and State of California, have invented a new and useful Process of Browning Flour, of which the following is a specification.

My invention relates to processes for browning flour.
My invention consists of a process for producing this product. I already have in the United States Patent Office an application, Serial No. 718,288, covering a portion of the specific apparatus for accomplishing this result, but I desire protection on the process for which I am applying in this application.

In my process I first sift the flour perfectly thus removing any lumps or cakes therein and then pass the finely divided flour slowly over the surface of heated metal plates keeping it in constant agitation during such movement.

This product is a new article, and a substitute for the imperfect and unsatisfactory methods and substances used in cooking, and it has never heretofore been offered to the public, because there has been no practical mechanism devised by means of which flour could be browned so as to make its color uniform and commercial.

It is well known that cooks in restaurants have been using caramel or burnt sugar and other adulterants, which is publicly known among cooks as the "monkey", for the purpose of giving color to gravies, soups and the like, because it has been a difficult matter to brown only a small quantity of flour for use in this way. The ordinary course of cooks has been to employ what has been termed a whiting, made usually of raw flour and water to be used for thickening gravies, stews, soups and other like articles of food.

This mechanism, and the new process of providing brown flour, make a product which will always keep pure, will not deteriorate by time, and that has the additional advantages that it can be dissolved in buillon, stock, or hot water, and does not have to be dissolved in cold water like raw flour. The result is that a rich flavor is produced, whereas, if raw flour, which must be dissolved in cold water is used, the flour is weakened and it lacks the flavor given by brown flour, and furthermore, does not require the addition of any adulterant like burnt sugar, which is prohibited by the pure food law.

It is well known that cooks and others have been trying to make the process by browning the flour in hot grease and the resultant product causes dyspepsia, and the character of that product is not uniform and rendered especially deleterious to health for the reason that in trying to make it dry during the process of browning it is burnt, and its flavor and value as a food product are thereby destroyed.

Samples of the burnt flour made by this process four years ago are as fresh today as when made. The product is a chocolate color and is not burnt, but on the other hand is merely browned so that it has a delicious flavor.

This process may be carried on by a variety of apparatus, one embodiment of which I illustrate in the accompanying drawings.

Figure 1 is a sectional, side elevation of the apparatus for carrying on my invention. Fig. 2 is a section on line $x^2$—$x^2$ of Fig. 1. Fig. 3 is a section on line $x^3$—$x^3$ of Fig. 1.

In the drawings, 1 is a base having bearings 2 thereon, these bearings supporting a shaft 3 on which is mounted a drum 4, this drum rotating inside a hollow casing 5. Under the casing 5 are burners 6 supplied with fuel such as gas or oil for the purpose of heating the drum. The hot gases from these burners 6 pass upwardly between the casing 5 and the drum 4 and are carried away by a stack 7. The shaft 3 is driven by a belt not shown, which engages a pulley 8. Mounted on the inlet end of the shaft 3 is a head 9 having openings 10 therein. The outlet end of the shaft 3 carries a head 11 which completely closes the end of the drum 4. In the drum 4 close to the head 11 openings 12 covered with a screen 13 are placed through which the browned flour is discharged into a receptacle 14. The inlet end of the drum 4 is closed, except for the openings 10, by the head 9, and on the outside of the head 9 is placed a cone 15 which serves to direct the flour from a chute 16 into the openings 10. The chute 16 receives raw flour from a hopper 17 of a sifter 18. This sifter consists of the hopper 17, a sieve 19 bent in the arc of a circle and swept by paddles 20. The paddles are mounted on a shaft 21 which is driven by a sprocket 22 mounted thereon, the sprocket 22 being driven by a chain 23 from a sprocket 24 which is mounted on the shaft 3.

The process is carried on by placing a quantity of raw flour in the sifter 18 where it is agitated by the paddles 20, passes through the sieve 19 and is fed in a finely divided condition to the interior of the drum 4. The drum 4 has a slight slope, and as it turns the flour passes through and finally outwardly through the openings 12.

It is very important that the flour be clean and in a finely divided condition and that after being so divided it be kept in motion continuously until finally browned. It will be noted that after being so divided by the sieve 19 it falls rapidly onto a moving plate of the drum and is thereafter constantly agitated by the motion of the drum. If allowed to sit for a time in a vessel of any kind the flour packs and will then burn if attempts are made to brown it.

What I claim is:

1. The process of browning flour consisting of reducing it to a finely divided condition and then passing it over a heated surface.

2. The process of browning flour consisting of screening and separating the flour and immediately thereafter subjecting it to the action of heat.

3. The process of browning flour consisting of screening and separating the flour and immediately thereafter passing it over a heated surface.

4. The process of browning flour consisting of reducing it to a finely divided condition and then passing it over a heated surface, said flour being kept in motion during the time it is passing over said plates.

5. The process of browning flour consisting of reducing it to a finely separated condition and immediately thereafter subjecting it to the action of heat, the flour being kept in motion during the period that heat is applied.

6. The process of browning flour consisting of reducing the flour to a finely separated condition, and immediately thereafter passing it over a heated surface, the flour being kept in motion during its passage over said plates.

7. The process of browning flour consisting of reducing it to a finely divided condition and then passing it over a heated surface, this surface being kept in continuous motion to prevent burning the flour.

8. The process of browning flour consisting of screening and separating the flour and immediately thereafter passing it over a heated surface, the said surface being kept in motion to prevent burning the flour.

In testimony whereof, I have hereunto set my hand at Los Angeles, California, this 12th day of May, 1913.

JOSEPH WALLOS.

In presence of—
 FRED A. MANSFIELD,
 P. H. SHELTON.